United States Patent
Souchard

(10) Patent No.: US 7,526,138 B1
(45) Date of Patent: Apr. 28, 2009

(54) CONTEXT BASED ADAPTIVE IMAGE RESAMPLING

(75) Inventor: Christophe Souchard, Marina Del Mar, CA (US)

(73) Assignee: Apple Inc., Cupertino, CA (US)

( * ) Notice: Subject to any disclaimer, the term of this patent is extended or adjusted under 35 U.S.C. 154(b) by 1021 days.

(21) Appl. No.: 10/826,635

(22) Filed: Apr. 15, 2004

(51) Int. Cl.
  G06K 9/40 (2006.01)
  G06K 9/64 (2006.01)
  G06K 9/32 (2006.01)
(52) U.S. Cl. .................... 382/260; 382/278
(58) Field of Classification Search .......... 382/298, 382/293, 228, 260, 261, 232, 239, 278, 276
  See application file for complete search history.

(56) References Cited

U.S. PATENT DOCUMENTS

| | | | |
|---|---|---|---|
| 6,650,790 B1 * | 11/2003 | Arbeiter et al. | 382/275 |
| 7,200,263 B2 * | 4/2007 | Curry et al. | 382/154 |
| 2003/0174892 A1 * | 9/2003 | Gao et al. | 382/225 |

* cited by examiner

*Primary Examiner*—Yon Couso
(74) *Attorney, Agent, or Firm*—Fenwick & West LLP

(57) ABSTRACT

A resampling process uses a predictive model to capture the spatial correlation among pixels in an input image, thus enabling adaptation of resampling schemes to the specific contents of the signal and noise contained in the image. The process combines automatic adjustment of a set of tap weights and formation of the inner product of a set of tap inputs and the corresponding set of tap weights to produce an output resized image.

15 Claims, 4 Drawing Sheets

CONTEXT BASED ADAPTIVE IMAGE RESAMPLING

FIELD OF THE INVENTION

This invention relates to image resampling techniques, and in particular to context based methods of adaptive resampling.

BACKGROUND

Bitmap images are defined as a fixed grid of pixels and thus are resolution dependent. Therefore, resampling techniques are required to change the resolution of an image, for example by increasing the size of the image. Resampling is the process of changing the size of a digital image by explicitly changing the number of pixels in the image. Using the original image as a template to work out the value for each new pixel, a new bitmap is created having the desired dimensions.

Several resampling techniques are known in the art. Two common methods are known as linear methods. One common linear method is known as the "nearest neighbor" method. This process overlays a new bitmap grid over the original grid and uses the values of the original pixel's coordinates that are closest to the new target pixel's coordinates to generate the new bitmap. In this process, some pixels may align better during the overlay than others. As a result, some original pixels may be used more than once and others may be discarded. The arbitrary nature of this pixel selection process results in visual artifacts. In down scaling, the likely artifacts are moiré patterns, whereas upscaling results in aliasing (jagged edges). With larger size increases, aliasing can become more pronounced, resulting in pixellation.

Referring now to FIG. 3A, there is shown an illustration of a pixel-level resampling process using a prior art "nearest neighbor" method 300. The example shown is a four pixel (2×2) portion of an original grayscale image 305. Each square represents a single pixel 310. The number in each pixel 310 represents the value of each respective pixel 310, with the lowest numbers representing the lightest gray and the highest numbers approaching black. The first step shows a 200% magnification 315 of the original 305. In this example, the 2×2 pixel image 305 is enlarged to 4×4 (16) pixels 315.

After the initial enlargement, the blank pixels are estimated based upon the original four pixels 305. To achieve this, the nearest neighbor method simply repeats the original pixel 310 in both the horizontal and vertical direction, as shown in the output image 320. The arbitrary nature of this pixel selection often results in visual artifacts. In the upscaling context, as with this example, the likely artifacts are jagged edges (aliasing). With larger size increases, aliasing can become more pronounced, resulting in pixilation.

Another known linear resampling method is bicubic interpolation. This method determines a value from the weighted average of the 16 surrounding pixels (in a 4×4 array). The averaging process reduces aliasing compared to the nearest neighbor method, but jagged edges are still visible and there is an accompanying loss of edge definition known as smoothing. The greater the image increases, the more the image edges are smoothed, with increases over 200% appearing as a soft mush. In addition, ringing artifacts, which appear as a halo around the edges, may result from bicubic interpolation. In short, linear methods of resampling cannot effectively eliminate all visual artifacts, and generally result in a tradeoff between aliasing, ringing, and/or blurring.

Referring now to FIG. 3B, there is shown an illustration of a pixel-level resampling process using a prior art bicubic interpolation method 325. The example again begins with a four pixel (2×2) portion of an original grayscale image 305. As with the nearest neighbor resampling method, the first step shows a 200% magnification 315 of the original 305.

Next, the blank pixels are estimated based upon the original four pixels 305 by gradually changing the values between known pixels 305. For example, in the top row the unknown pixel 330a is estimated to have a value of 30, the midpoint the values (10 and 50, respectively) of the known pixels 310 on each side. In the second row, the value of the unknown pixel 330b without known pixels beside it is determined from the estimates of the other (previously unknown) pixels 330 on all four sides. Once this process is complete for all unknown pixels 330, the output image is complete. The bicubic interpolation resampling process reduces visible aliasing, but produces an accompanying loss of edge definition known as smoothing. In addition, ringing artifacts may result, appearing as a halo around the edges.

Another group of resampling methods are known as edge-adaptive methods, such as NEDI (New Edge Directed Interpolation) or S-Spline. These methods use averages like bicubic interpolation, but also look at the value of the pixels, in an effort to detect edges and keep sharper areas sharp. However, these methods also produce undesirable visual artifacts. For example, random pixels may appear in or near smooth image areas such as curves. In addition, small sized, repeating patterns or areas of fine structure do not resample well through these methods, producing unnatural looking results for images depicting objects such as vinyl siding or blades of grass.

Accordingly, there is a need to provide a resampling method, system, and computer program product that provides sharp picture quality and reduces visual artifacts.

SUMMARY OF THE INVENTION

The present invention provides a context based adaptive resampling system, method, and computer program product to achieve clearer downscaled and upscaled images with fewer visual artifacts. The method uses a predictive model to capture the spatial correlation among pixels in an input image to adapt resampling schemes to the specific contents of the signal and noise contained in the image. To accomplish this goal, the method assumes that auto-correlation structures are resolution invariant and uses a combination of two processes: an adaptive process and a resampling process.

The adaptive process involves automatic adjustment of a set of tap weights. First, input image statistics are estimated from input pixel values. In one embodiment, the input image statistics are an auto-correlation matrix and covariance vector. Then, the input image statistics are substituted for unknown output image statistics under the assumption that auto-correlation structures are resolution invariant. Finally, the optimum set of tap weights is determined using the classic Wiener-Hopf solution.

The resampling process involves forming the inner product of a set of tap inputs and the corresponding set of tap weights. The tap weights used are those calculated from the adaptive process. The result of the resampling process is the pixel values of the resized output image.

Using the spatial correlation among pixels in the input image to adapt resampling schemes to the specific contents of the signal and noise contained in the image produces a sharper picture with fewer undesirable visual artifacts. The method uses a mathematical algorithm to estimate and preserve interpixel relationships within the images, thus keeping edges sharp, while allowing softer areas of the image to remain smooth.

DETAILED DESCRIPTION OF THE EMBODIMENTS

System Architecture

Figure 1:
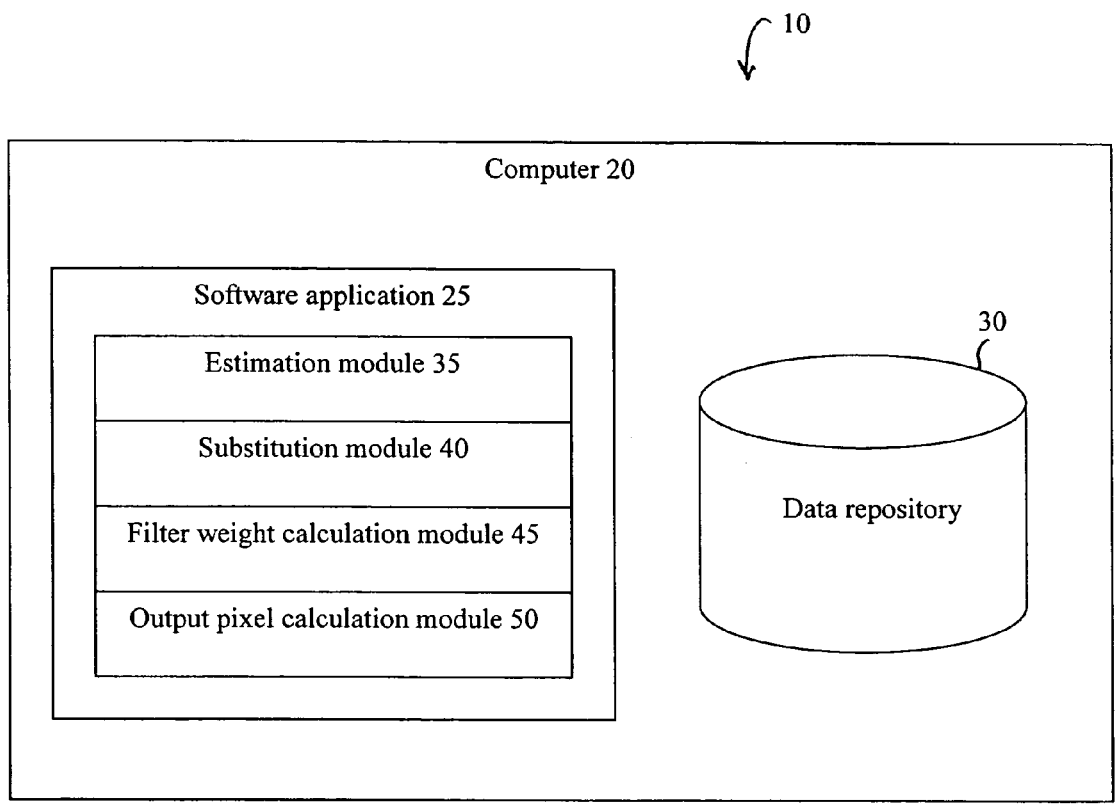
FIG. 1 is an illustration of the architecture of a system useful for providing context based adaptive image resampling in accordance with one embodiment of the present invention.

Referring now to FIG. 1, there is shown an illustration of the architecture of a system 10 for providing context based adaptive image resampling in accordance with one embodiment of the present invention. In such a system 10, there is provided a computer 20. The computer 20 is of conventional design, and includes a processor, an addressable memory, and other conventional features (not illustrated) such as a display, a local hard disk, input/output ports, a keyboard, a mouse, and a network interface. In one embodiment the computer 20 may be implemented on a Macintosh® computer running an operating system such as Macintosh OS X®. In other embodiments, the computer 20 can be a SPARC®-based computer running Solaris® or an Intel®V-based computer running Linux® or UNIX®, or any other equivalent devices.

In accordance with one embodiment of the present invention, the computer 20 includes a software application 25 and a data repository 30. The computer 20 executes the software application 25 according to this embodiment of the present invention. The application 25 includes a number of executable code portions and data files. These include code for resampling images, handling input, and generating output.

The application 25 may be provided to the computer 20 on computer readable media, such as a CD-ROM, diskette, or by electronic communication over a network from software distributors, for installation and execution thereon. Alternatively, the application 25 can be hosted on a server computer, and accessed over a network by the user, for example using a browser interface to the application 25.

In accordance with the present invention, the computer 20 maintains a data repository 30 for storing information relating to software application 25. The repository 30 may be a conventional database accessible by the application 25 through a user interface. The application 25 accesses and queries the repository 30 to retrieve data records associated with the software application 25.

In one embodiment, the software application 25 further comprises an estimation module 35, a substitution module 40, a filter weight calculation module 45, and an output pixel calculation module 50. An estimation module 35 executes an application logic to estimate input image statistics from input pixel values selected. The input image statistics estimated include an auto-correction matrix and a covariance vector. A substitution module 40 executes an application logic to replace unknown output image statistics with the input image statistics estimated by the estimation module 35. This substitution assumes that auto-correlation structures are resolution invariant. A filter weight calculation module 45 executes an application logic to calculate an optimum set of filter weights. In one embodiment, this calculation utilizes the classic Wiener-Hopf solution. An output pixel calculation module executes an application logic to calculate output pixel values from the inner product of a set of input pixel values and corresponding filter tap weights from the filter weight calculation module 45. The assumptions and estimations used in this process are not mathematically exact; however, they achieve better resampling performance than known prior art methods.

Workflow

Figure 2:
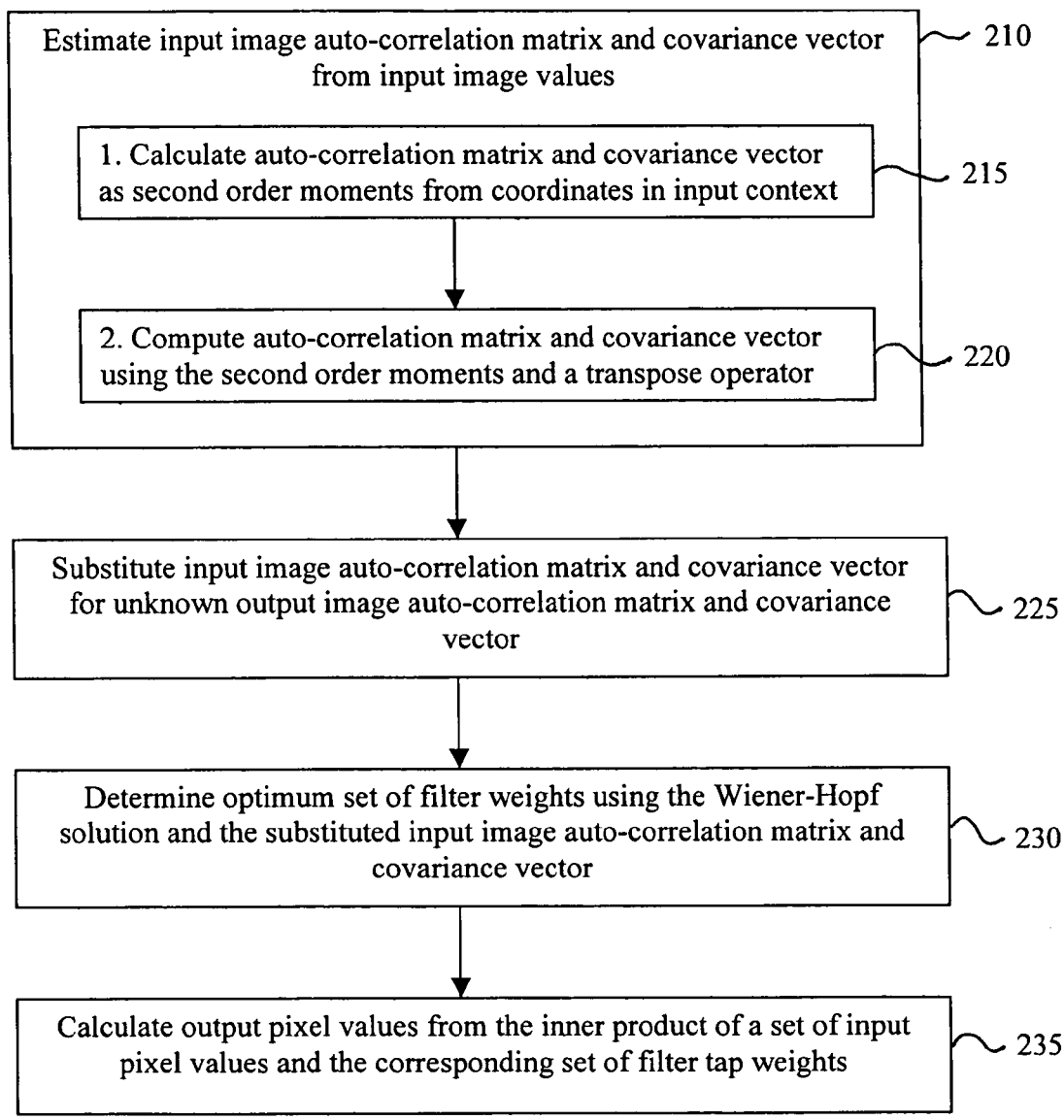
FIG. 2 is a process diagram illustrating the steps of a context based adaptive image resampling process in accordance with one embodiment of the present invention.

Referring now to FIG. 2, there is shown a process diagram illustrating the steps of a context based adaptive image resampling process in accordance with one embodiment of the present invention.

As shown, the process begins by estimating 210 input image auto-correlation matrix and covariance vector from input image values. In this example, the estimation involves two steps. The first step is calculating 215 the auto-correlation matrix and covariance vector as second order moments from pixel values in an input context. Here, the input context is defined as a rectangular window centered on each coordinate in the input image. The second step is computing 220 the auto-correlation matrix and covariance vector using the second order moments and a transpose operator.

The next step is substituting 225 the input image auto-correlation matrix and covariance vector for an unknown output image auto-correlation matrix and covariance vector, then determining 230 an optimum set of filter weights. This can be accomplished by using the classic Wiener-Hopf solution ($w=R^{-1}*r$) to solve for the optimal weights (w) to minimize prediction error, using the substituted input image auto-correlation matrix (R) and covariance vector (r).

The substitutions in steps 225 and 230 are based on the underlying assumption that auto-correlation structures are resolution invariant. Using the Wiener-Hopf solution for a stationary Gaussian process yields a solution that is well known and equivalent to the Maxium a Posteriori (MAP) estimate of w. However, natural images cannot be modeled as stationary Gaussian processes. In addition, the auto-correlation matrix and covariance vector of the output image cannot be estimated because the calculation would require information about the output context that is not available. While not mathematically exact in theory, the forced assumption that auto-correlation structures are resolution invariant achieves, in practice, better resampling output than other methods.

The next step is calculating 235 output pixel values from the inner product of a set of input pixel values and the corresponding set of filter tap weights. Specifically, the output pixel values are the sum of, for pixels in the context of the input image, the product of the optimal weights and input pixel values.

Pixel-Level Resampling

Figure 3A:
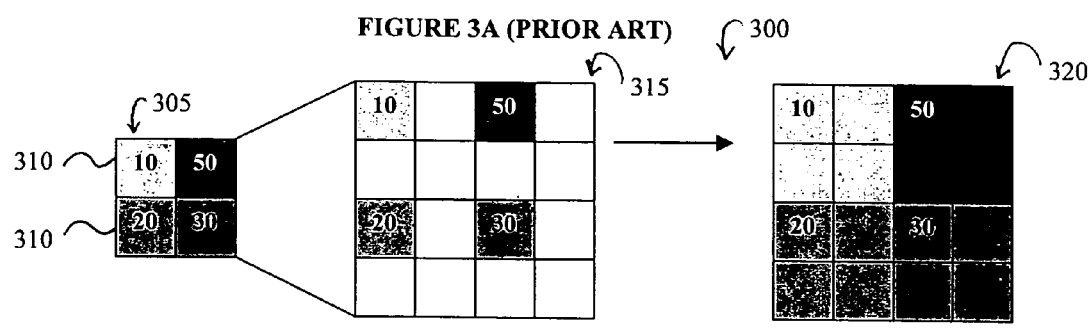
FIG. 3A is an illustration of a pixel-level resampling process using the prior art "nearest neighbor" method.
Figure 3B:
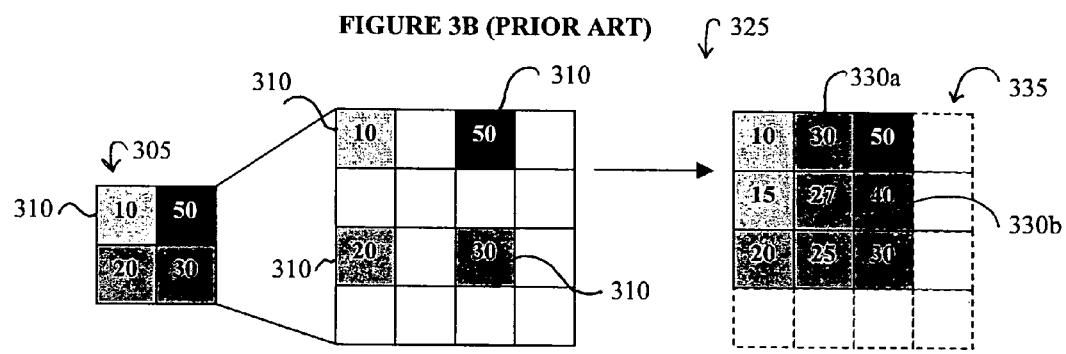
FIG. 3B is an illustration of a pixel-level resampling process using the prior art bicubic interpolation method.
Figure 3C:
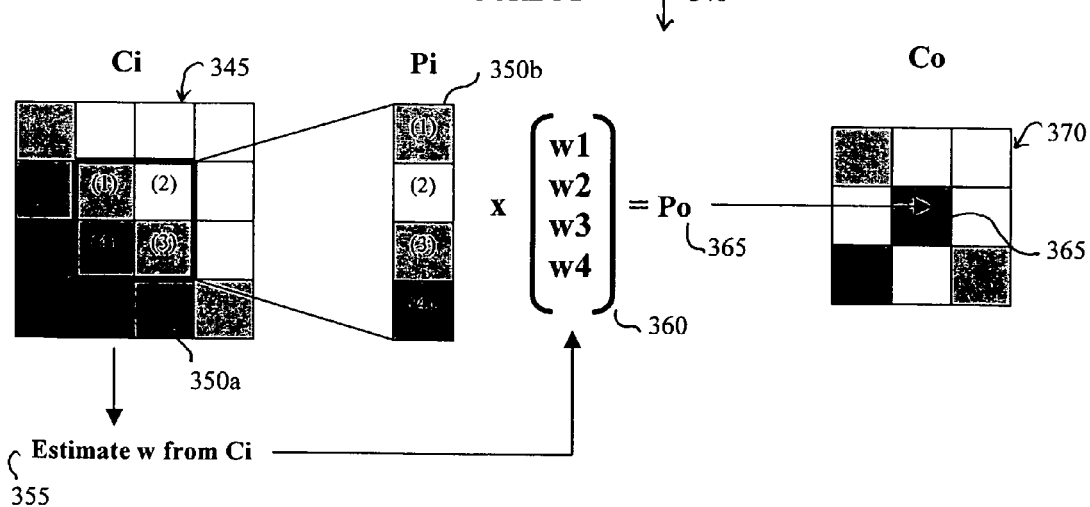
FIG. 3C is an illustration of a pixel-level resampling process using a context based adaptive image method in accordance with one embodiment of the present invention.

Referring now to FIG. 3C, there is shown an illustration of a pixel-level resampling process using a context based adaptive image method 340 in accordance with one embodiment of the present invention to produce a 200% magnification of the input image 350. In this example, a portion of an input image (Pi) 350a, a 2×2 (4) pixel square, is shown at the center of its context (Ci) 345, a 4×4 (16) pixel square 345. The context (Ci) 345 is a rectangular window of size (N+1)*(N+1) centered on Pi 350a, wherein (N+1)=4. To illustrate the calculation, the input image 350 also is shown in linear form 350b. Using the input context (Ci) 345, a set of corresponding filter tap weights (w) 360 are estimated, using the following information.

The low resolution/input image Pi(x,y) is of size (W,H). Its context (Ci) is a rectangular window of size (N+1)*(N+1), centered on Pi (x,y). The high resolution/output image Po(x, y) is of size (2*W,2*H). Its context (Co) is a rectangular window of size (2N+1)*(2N+1), centered on Po (2x,2y). In this example, we estimate an unknown pixel Po(i,j) from neighbors Po (k,l) in Co. Here, i=2x+1, j=2y+1, and N can be small.

The following pseudocode illustrates the computation of the auto-correlation matrix (R) and covariance vector (r) in Ci 345 as second order moments:

```
Calc_M1
{
   M1 = 0;
   Nelement = (N + 1)*(N + 1);
   for I (0 . . . Nelement)

M1 +=Ci→atPos(i);
   }
   M1 /= Nelement;
}
calc_M2
{
   Nelement = (N + 1)*(N + 1);
   for I (0 . . . Nelement)
   {
   M2[i]= 0;
   for j (0 . . . Nelement)
   {
      M2[i]+= Ci→atPos(j) * Ci→atPos((j + I) % Nelement);
   }
   }
}
calc_V
{
   Nelement = (N+1);
   k = 0;
   for I (0 . . . Nelement)
   {
   V[i] = 0;
   for j (0 . . . Nelement)
   {
      V[i]+= M2[I*Nelement + j]* Ci→atPos(k);
      k++;
   }
}
```
}

This step also is depicted in FIG. 2, block 215.

The next step is to compute R=(Tr(M2)*M2)/M1 and r=(Tr (M2)*V)/M1 (Tr=transpose operator), depicted in FIG. 2, block 220, and use R1 (inverse of R), to solve for the optimal coefficients (w) 360 using Wiener-Hopf, as illustrated by the following pseudocode:

```
Calc_w
{
   Nelement = (N + 1);
   for I (0 . . . Nelement)
   {
   w[i] = 0;
   for j (0 . . . Nelement)
   {
      w[i] +=R1[I*Nelement + j] * r[j];
   }
   }
}
{
```

These steps result in the values for the filter weights (w) 360, and are depicted in FIG. 2, blocks 225 and 230.

Then, the output pixel value (Po) 365 is calculated, using the inner product of the set of input pixel values (Pi) 350b and the corresponding filter tap weights (w) 360, as illustrated by the following pseudocode:

```
Calc_Po
{
   Nelement = (N + 1);
   Po = 0;
   for j (0 . . . Nelement)
   {
      Po += w[j] * Ci→atPos(j));
   }
}
```

These calculations produce the output pixel value (Po) 365, depicted as the middle pixel 365 in the output context (Co) 370. This step is depicted as FIG. 2, block 235.

Output Image

Figure 4A:
FIG. 4A is an illustration of an input image before any resampling.

Referring now to FIGS. 4A-D, there is shown an original image (FIG. 4A) and the images resulting from a 200% magnification using various resampling methods. FIG. 4A depicts an original image at 100% before any resampling.

Figure 4C:
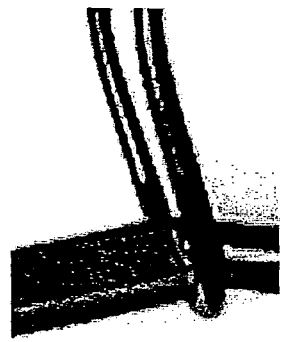
FIG. 4C there is an illustration of an image resulting from using the prior art bicubic interpolation method to resample the image shown in FIG. 4A to 200% magnification.
Figure 4D:
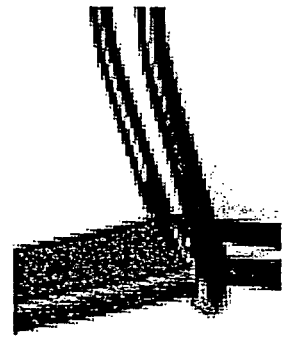
FIG. 4D is own an illustration of an image resulting from using a context based adaptive image method to resample the image shown in FIG. 4A to 200% magnification in accordance with one embodiment of the present invention.
Figure 4B:
FIG. 4B is an illustration of an image resulting from using the prior art "nearest neighbor" method to resample the image shown in FIG. 4A to 200% magnification.

Referring now to FIG. 4B, there is shown an illustration of an image resulting from using the prior art "nearest neighbor" method to resample the image shown in FIG. 4A to 200% magnification. As shown, aliasing artifacts are visible at the edges, also known as jaggies.

Referring now to FIG. 4C, there is shown an illustration of an image resulting from using the prior art bicubic interpolation method to resample the image shown in FIG. 4A to 200% magnification. As shown, the aliasing is still visible, and the image has lost some of its detail, due to smoothing.

Referring now to FIG. 4D, there is shown an illustration of an image resulting from using a context based adaptive image method to resample the image shown in FIG. 4A to 200% magnification in accordance with one embodiment of the present invention. As shown, this method achieves the goal of enhancing image details while reducing aliasing and ringing. By using a predictive model to capture the spatial correlation among pixels in an input image, the method of the present invention adapts its resampling scheme to the specific contents of the signal and noise contained in the image. The result is clearer images with fewer visual artifacts.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware and/or firmware elements. More specifically, it will be apparent to those of ordinary skill in the art that the software application 25 disclosed herein can be implemented as software, hardware, firmware, or any combination of these. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are a means used by those skilled in the data processing arts to most effectively convey the substance of their work to others skilled in the art. These operations, while described functionally or logically, are understood to be implemented by computer programs, hardware logic, or firmware. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and/or best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method of pixel-level image resampling, comprising:
    using a processor to perform the steps of: receiving an input image to be resampled;
    calculating second order moments for an input auto-correlation matrix and an input covariance vector from input pixel values in an input context for the input image to be resampled;
    transposing the input auto-correlation matrix and the input covariance vector using the second order moments and a transpose operator;
    substituting the transposed input auto-correlation matrix and the transposed input covariance vector for an unknown output auto-correlation matrix and an unknown output covariance vector for an output context;
    determining an optimum set of filter tap weights for minimizing prediction error for a resampled output image from the output auto-correlation matrix and the output covariance vector; and
    calculating output pixel values from the input pixel values and the optimum set of filter tap weights to produce the resampled output image.

2. The method of claim 1, wherein the step of determining an optimum set of filter tap weights further comprises computing the product of the output covariance vector and the inverse of the output auto-correlation matrix.

3. The method of claim 1, wherein the step of calculating output pixel values further comprises computing the product of the set of filter tap weights and input pixel values, for pixel values in the input context.

4. A computer-implemented method of image resampling, comprising:
    using a processor to perform the steps of: receiving an input image to be resampled;
    calculating second order moments for an input auto-correlation matrix and an input covariance vector from input pixel values in an input context for the input image; and transposing the input auto-correlation matrix and the input covariance vector using the second order moments and a transpose operator;

substituting the transposed input auto-correlation matrix and the transposed input covariance vector for an unknown output auto-correlation matrix and an unknown output covariance vector for an output context;

calculating an optimum set of filter tap weights for minimizing prediction error for a resampled output image as the product of the output covariance vector and the inverse of the output auto-correlation matrix; and calculating output pixel values to produce the resampled output image as the product of the optimum set of filter tap weights and input pixel values for pixel values in the input context.

5. A computer-readable storage medium encoded with a computer program for image resampling, the computer-readable storage medium comprising computer program code, coded on the computer-readable storage medium, comprising:

a receiving module for receiving an input image to be resampled;

an estimation module configured to calculate second order moments for an input auto-correlation matrix and an input covariance vector from input pixel values in an input context for the input image to be resampled;

a transposing module configured to transpose the input auto-correlation matrix and the input covariance vector using the second order moments and a transpose operator;

a substitution module configured to substitute the transposed input auto-correlation matrix and the transposed input covariance vector for an unknown output auto-correlation matrix and an unknown output covariance vector for an output context;

a filter weight calculation module configured to determine an optimum set of filter tap weights for minimizing prediction error for a resampled output image from the output auto-correlation matrix and the output covariance vector; and an output pixel calculation module configured to calculate output pixel values from the input pixel values and the optimum set of filter tap weights to produce the resampled output image.

6. The computer-readable storage medium of claim 5, wherein the filter weight calculation module configured to determine an optimum set of filter tap weights is further configured to calculate the product of the output covariance vector and the inverse of the output auto-correlation matrix.

7. The computer-readable storage medium of claim 5, wherein the output pixel calculation module configured to calculate output pixel values is further configured to calculate the product of the set of filter tap weights and input pixel values, for pixel values in the input context.

8. A system for image resampling, comprising:
a processor;
means for receiving an input image to be resampled;
means for calculating second order moments for an input auto-correlation matrix and an input covariance vector from input pixel values in an input context for the input image to be resampled;

means for transposing the input auto-correlation matrix and the input covariance vector using the second order moments and a transpose operator;

means for substituting the transposed input auto-correlation matrix and the transposed input covariance vector for an unknown output auto-correlation matrix and an unknown output covariance vector for an output context;

means for determining an optimum set of filter tap weights for minimizing prediction error for a resampled output image from the output auto-correlation matrix and the output covariance vector; and means for calculating output pixel values from the input pixel values and the optimum set of filter tap weights to produce the resampled output image.

9. The system of claim 8, wherein the means for determining an optimum set of filter tap weights further comprises computing the product of the output covariance vector and the inverse of the output auto-correlation matrix.

10. The method of claim 8, wherein the means for calculating output pixel values further comprises computing the product of the set of filter tap weights and input pixel values, for pixel values in the input context.

11. A system for image resampling an image, comprising:
a processor;
means for receiving an input image to be resampled;
means for calculating second order moments for an input auto-correlation matrix and an input covariance vector from input pixel values in an input context for the input image to be resampled;

means for transposing the input auto-correlation matrix and the input covariance vector using the second order moments and a transpose operator;

means for substituting the transposed input auto-correlation matrix and the transposed input covariance vector for an unknown output auto-correlation matrix and an unknown output covariance vector for an output context;

means for calculating an optimum set of filter tap weights for minimizing prediction error for a resampled output image as the product of the output covariance vector and the inverse of the output auto-correlation matrix; and means for calculating output pixel values to produce the resampled output image as the product of the set of filter tap weights and input pixel values for pixel values in the input context.

12. The method of claim 1, wherein the input context comprises a rectangular window centered on each coordinate in the input image.

13. The method of claim 4, wherein the input context comprises a rectangular window centered on each coordinate in the input image.

14. The computer-readable storage medium of claim 5, wherein the input context comprises a rectangular window centered on each coordinate in the input image.

15. The system of claim 8, wherein the input context comprises a rectangular window centered on each coordinate in the input image.

* * * * *